(12) United States Patent
Han et al.

(10) Patent No.: US 9,203,568 B2
(45) Date of Patent: Dec. 1, 2015

(54) SYSTEMS AND METHODS FOR GENERATING A DISCOVERY SIGNAL IN A DEVICE-TO-DEVICE OR NETWORK COMMUNICATION

(71) Applicant: Intel IP Corporation, Santa Clara, CA (US)

(72) Inventors: Seunghee Han, Kyoungkido (KR); Jong-Kae Fwu, Sunnyvale, CA (US); Youn Hyoung Youn Heo, Seoul (KR); Apostolos Papathanassiou, San Jose, CA (US); Hong He, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 12 days.

(21) Appl. No.: 14/127,929

(22) PCT Filed: Sep. 27, 2013

(86) PCT No.: PCT/US2013/062444
§ 371 (c)(1),
(2) Date: Dec. 19, 2013

(87) PCT Pub. No.: WO2014/113088
PCT Pub. Date: Jul. 24, 2014

(65) Prior Publication Data
US 2014/0198764 A1    Jul. 17, 2014

Related U.S. Application Data

(60) Provisional application No. 61/753,914, filed on Jan. 17, 2013.

(51) Int. Cl.
*H04W 4/00*     (2009.01)
*H04L 5/00*     (2006.01)

(52) U.S. Cl.
CPC ............ *H04L 5/0012* (2013.01); *H04L 5/0007* (2013.01); *H04L 5/0016* (2013.01); *H04L 5/0048* (2013.01); *H04L 5/0053* (2013.01)

(58) Field of Classification Search
CPC ... H04L 5/0005; H04L 5/0007; H04L 5/0012; H04L 5/001; H04L 5/0048; H04L 5/0016; H04L 5/0053
See application file for complete search history.

(56) References Cited

U.S. PATENT DOCUMENTS 9,060,360 B2 *   6/2015   Yang et al. ............................. 1/1
2010/0067461 A1 *   3/2010   Kwak et al. .................... 370/329
(Continued)

FOREIGN PATENT DOCUMENTS

KR    10-2012-0041141 A    4/2012
WO    2012/128490 A2    9/2012
(Continued)

OTHER PUBLICATIONS

International Search Report and Written Opinion received for PCT Patent Application No. PCT/US2013/062444, mailed on Jan. 28, 2014, 15 Pages.

*Primary Examiner* — Kevin Mew
(74) *Attorney, Agent, or Firm* — Stoel Rives LLP

(57) ABSTRACT

The techniques introduced here provide for device discovery of a greater number of mobile devices in a mobile network by increasing the multiplexing capacity of the system. The techniques may be applied to device-to-device communication networks and small cells using low power nodes (e.g., pico and femto eNodeB in a 3GPP LTE or LTE advanced network). Additionally, the techniques provide for mapping between a mobile device ID and an orthogonal resource of the discovery signal.

24 Claims, 7 Drawing Sheets

(56) References Cited

U.S. PATENT DOCUMENTS

| | | | |
|---|---|---|---|
| 2011/0200018 A1* | 8/2011 | Tazeh et al. | 370/336 |
| 2011/0310856 A1* | 12/2011 | Hariharan et al. | 370/336 |
| 2012/0033571 A1* | 2/2012 | Shimezawa et al. | 370/252 |
| 2012/0076100 A1* | 3/2012 | Noh et al. | 370/329 |
| 2012/0099545 A1* | 4/2012 | Han et al. | 370/329 |
| 2012/0106478 A1* | 5/2012 | Han et al. | 370/329 |
| 2012/0176885 A1* | 7/2012 | Lee et al. | 370/209 |
| 2012/0327880 A1* | 12/2012 | Ahn et al. | 370/329 |
| 2013/0301571 A1* | 11/2013 | Sorrentino et al. | 370/329 |
| 2014/0003262 A1* | 1/2014 | He et al. | 370/252 |

FOREIGN PATENT DOCUMENTS

| | | |
|---|---|---|
| WO | 2012/128505 A2 | 9/2012 |
| WO | 2012/129806 A1 | 10/2012 |
| WO | 2012/174152 A2 | 12/2012 |

* cited by examiner

SYSTEMS AND METHODS FOR GENERATING A DISCOVERY SIGNAL IN A DEVICE-TO-DEVICE OR NETWORK COMMUNICATION

RELATED APPLICATION

This application claims priority benefit of U.S. Provisional Patent Application No. 61/753,914, filed Jan. 17, 2013 which is hereby incorporated by reference herein in its entirety.

TECHNICAL FIELD

The present application relates to device discovery and more particularly to device discovery for device-to-device or small network communications.

BACKGROUND ART

Proximity-based applications and services represent a fast growing social and technological trend that may have a major impact on the evolution of cellular wireless/mobile broadband technologies. These services may include the awareness that at least two devices or two users are close to each other and, thus, may be able to directly communicate with each other. Proximity-based applications may include social networking, mobile commerce, advertisement, gaming, etc. Device-to-device (D2D) communication may be seamlessly integrated into current and next generation mobile broadband networks such as 3GPP Long Term Evolution (LTE) and LTE-Advanced. However, the existing mobile broadband networks may not be optimized for D2D specific requirements; for instance, they do not support the establishment of direct links between two devices.

Additionally, small cells using low-power nodes are considered promising to cope with mobile traffic explosion, especially for hotspot deployments in indoor and outdoor scenarios. A low-power node may refer to a node with lower transmit power than a typical macro node (e.g., a macro eNode-B (eNB)). Pico and Femto eNB are representative of low-power nodes.

DESCRIPTION OF THE EMBODIMENTS

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

The number of mobile devices (e.g., LTE user equipment (UE), or the like) that can simultaneously communicate within a network is typically a function of the number of physical resource blocks (PRBs) available for communication and the capacity to multiplex UE communications on those PRBs.

As introduced above, it is anticipated that a large number of users may participate in D2D communications within a small geographic area or connect to larger networks via small cells. Therefore, to facilitate the large number of users, it would be beneficial to define communication protocols that have a large multiplexing capacity. Additionally, D2D and small cell users may operate in a co-existing mode and reuse the spectrum with other cellular users meaning a greater multiplexing capacity would facilitate a larger number of users that could share the spectrum.

One particular aspect of D2D communication and accessing small cells that would benefit from an increased multiplexing capacity is device discovery. The techniques introduced herein describe systems and methods to increase multiplexing capacity for discovery signals in both usage scenarios.

It is noted that although the techniques introduced herein are described based on 3GPP LTE formats 1, 1a, and 1b for the physical uplink control channel (PUCCH), the techniques may be applied to other appropriate physical channel variants. For example, if a discovery signal structure is based on at least Frequency Division Multiplexing (FDM) and/or Code Division Multiplexing (CDM) for UE multiplexing, the techniques introduced herein may be applicable.

Figure 1:
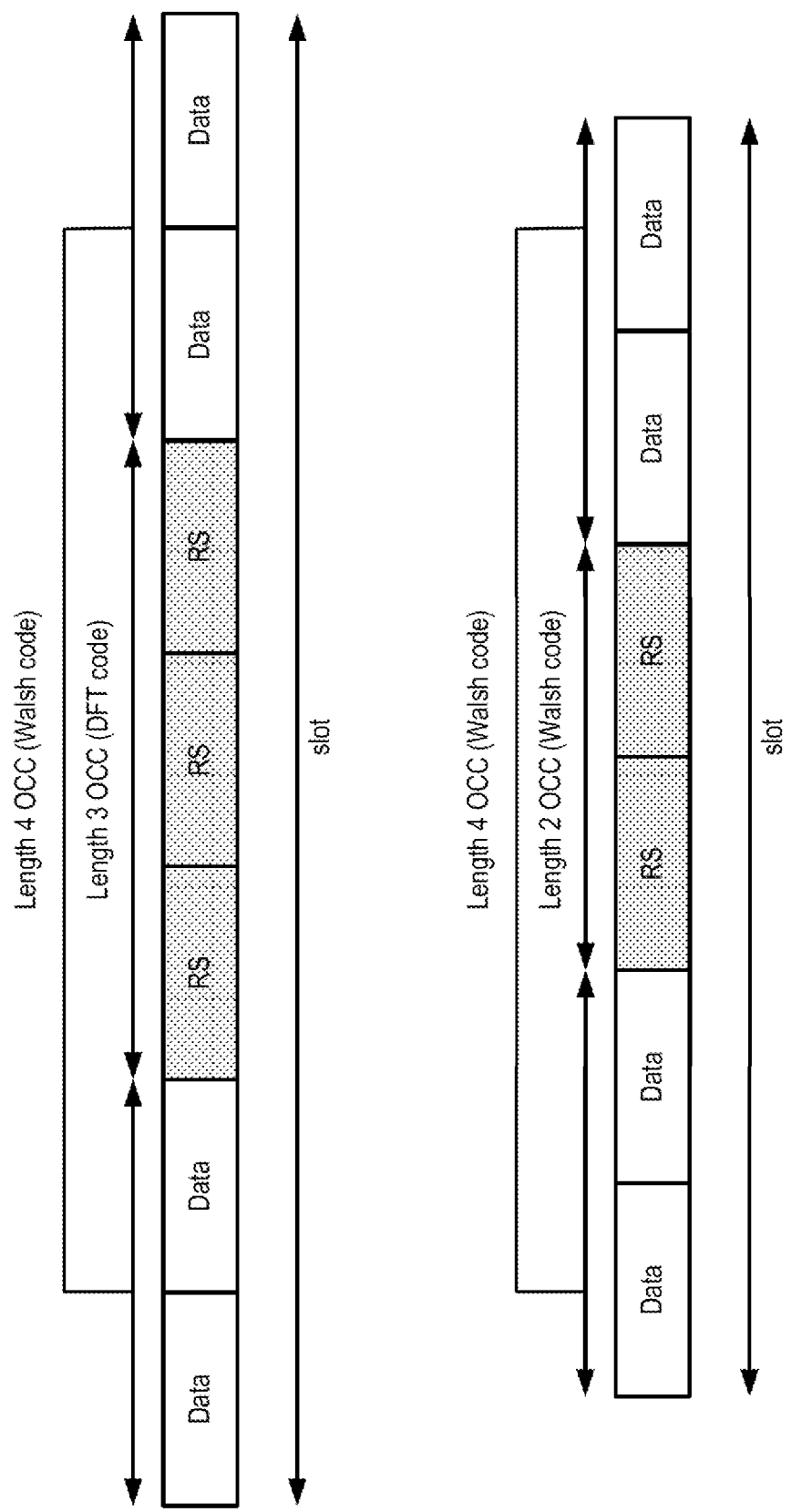
FIG. 1 depicts an example structure of PUCCH format 1, 1a, and 1b in a slot for normal and extended cyclic prefix (CP) cases, respectively.

FIG. 1 depicts an example structure of PUCCH format 1, 1a, and 1b in a slot for normal and extended cyclic prefix (CP) cases, respectively. In the normal CP case, there are three single-carrier frequency division multiple access (SC-FDMA) symbols for reference signal (RS) transmission and four SC-FDMA symbols for data transmission, respectively. In the extended CP case, there are two SC-FDMA symbols for RS and four SC-FDMA symbols for data. To facilitate multiplexing of UEs, in the normal CP case, an orthogonal code cover (OCC) of length 3 may be applied on the RS part and an OCC of length 4 may be applied on the data part at the SC-FDMA symbol level. In the extended CP case, an OCC of length 2 may be applied on the RS part at the SC-FDMA symbol level. While the symbols are described in the various examples herein as SC-FDMA, any multiple access symbol may be used, for example, orthogonal frequency division multiple access (OFDMA) symbols or the like.

The overall multiplexing capacity in a slot is limited by the part having the smaller multiplexing capacity. For example, in the normal CP case, the overall multiplexing capacity is three. This is because the smaller multiplexing capacity belongs to the RS part, which is three (due to the OCC of length 3), while the multiplexing capacity of the data part is four (due to the OCC of length 4).

An additional orthogonal sequence of cyclic shift (CS) can be used to provide higher multiplexing capacity. A cyclic shift may be physically a time-domain cyclic shift and the equivalent implementation is to apply a phase rotation sequence in the frequency-domain. Conversely, if a cyclic shift is physically a frequency-domain cyclic shift, the equivalent implementation may be a phase rotation in the time domain. In short, there is a duality between time and frequency domains. As used herein, cyclic shift can be time or frequency domain CS.

The maximum number of cyclic shifts may be a function of the maximum delay spread of the physical channel and the length of a symbol. For example, assuming a maximum delay spread of 5 µs and a symbol length of 66.67 µs, 13 cyclic shifts are theoretically available within a symbol (i.e., 66.67 µs/5 µs). However, in practice 12 cyclic shifts would typically be employed to provide for greater reliability.

As introduced above, the multiplexing capacity of a network or other communication system (e.g., D2D) is a function of PRBs and multiplexing capacity. The combination of a CS, and OCC, and a PRB may be presented as an orthogonal resource (i.e., a resource that can be uniquely identified). An orthogonal resource can be used for UE multiplexing. The maximum multiplexing capacity of a communication system can be defined as the product of the maximum multiplexing capacity of CS, OCC, and PRBs, as shown below.

$$N_{max,total} = N_{max,CS} \cdot N_{max,OCC} \cdot N_{max,PRB}$$

where:
$N_{max,CS}$: maximum multiplexing capacity using CS
$N_{max,OCC}$: maximum multiplexing capacity using OCC
$N_{max,PRB}$: maximum multiplexing capacity using PRB As an example, assuming a CS multiplexing capacity of 12 and an OCC multiplexing capacity of 3 (as explained above for a normal CP case), a communication system having a 20 MHz system bandwidth (i.e., 100 PRBs in total with 50 PRBs being available due to slot-level frequency hopping), the total maximum multiplexing capacity would be 1800 (i.e., $N_{max,total}=12 \cdot 3 \cdot 50$). In order to increase the maximum multiplexing capacity of the communication system, any one of the maximum multiplexing capacities described above may be increased.

Figure 2:
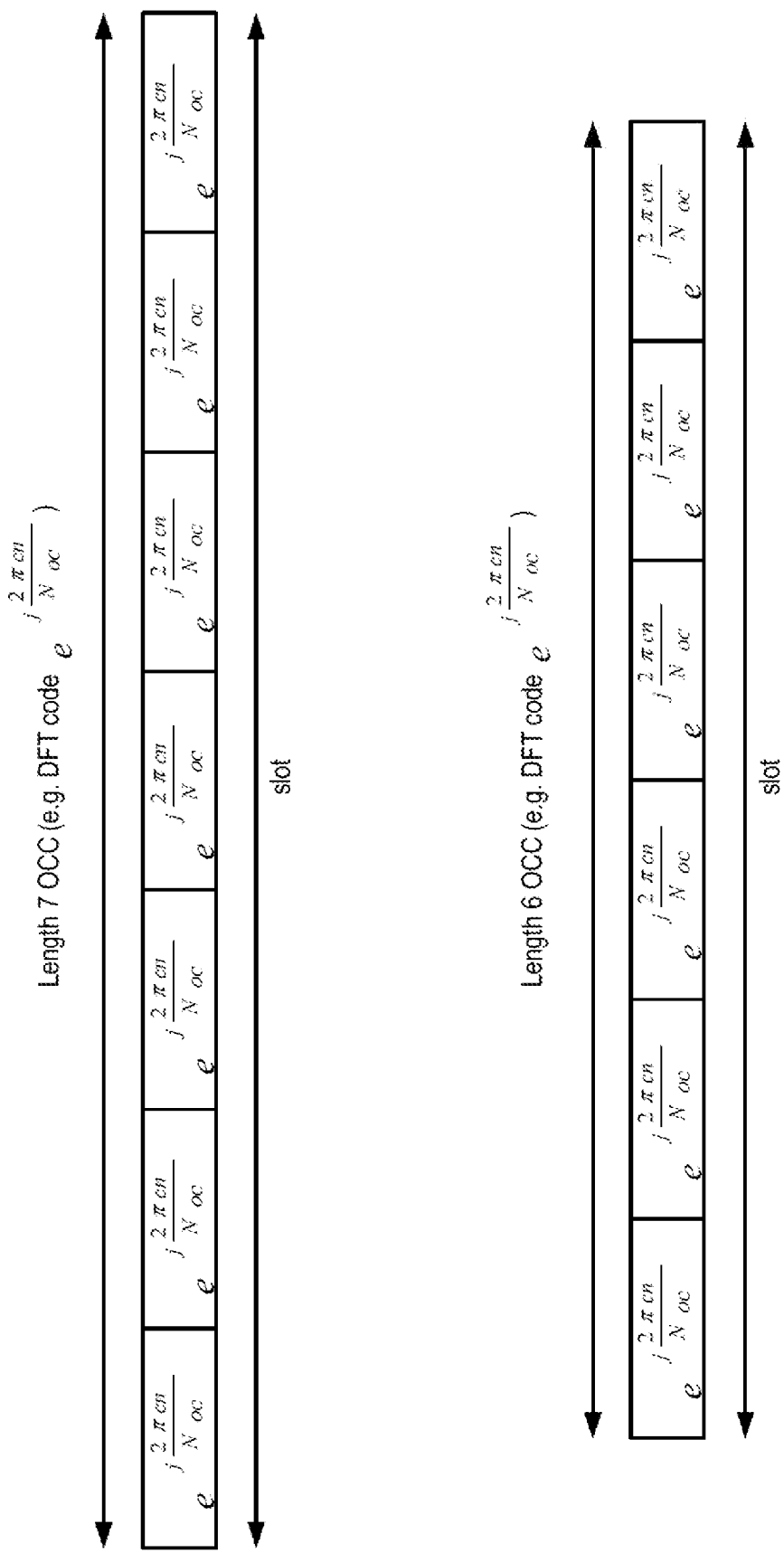
FIG. 2 illustrates an example PUCCH structure with a slot length OCC.

In one embodiment, the OCC may be modified to increase the total multiplexing capacity of the system. For example, an OCC of length N may be applied over the entire SC-FDMA symbol within a slot. The length of the OCC, in the examples of a normal CP SC-FDMA symbol and an extended CP SC-FDMA symbol, may be 7 and 6, respectively. FIG. 2 illustrates an example PUCCH structure with a slot length OCC. In one embodiment, the length N OCC may be a discrete Fourier transform (DFT) code as shown in the example of FIG. 2. However, it should be noted that other orthogonal codes may be used, for example, a Walsh code or Hadamard sequence, or the like.

As explained above, the maximum OCC multiplexing capacity of a communication system is limited by the OCC length of the smallest part. In this embodiment, because there is no differentiation between parts, the maximum multiplexing capacity of the communication system is increased to 7 or 6 for normal CP or extended CP, respectively. Therefore, the total multiplexing capacity of the communication system, assuming the same characteristics as described above, would be 4200 (i.e., $N_{max,total}=12 \cdot 7 \cdot 50$) and 3600 (i.e., $N_{max,total}=12 \cdot 6 \cdot 50$) for normal CP or extended CP, respectively.

In the example of FIG. 2, there is no differentiation between a RS part and a data part in the SC-FDMA symbol. Therefore, a non-coherent signal detection without channel estimation based on the RS part may be employed to detect a discovery signal using this format. In some embodiments, frequency hopping at the slot level may be further applied to provide frequency diversity gain.

In some embodiments, a shortened PUCCH format may be defined by puncturing the last SC-FDMA symbol within a subframe to accommodate sounding reference symbol (SRS) transmission. The addition of the SRS will result in a slight decrease in the overall multiplexing capacity when compared to the example of FIG. 2, but will still yield an increase over the example of FIG. 1.

Figure 3:
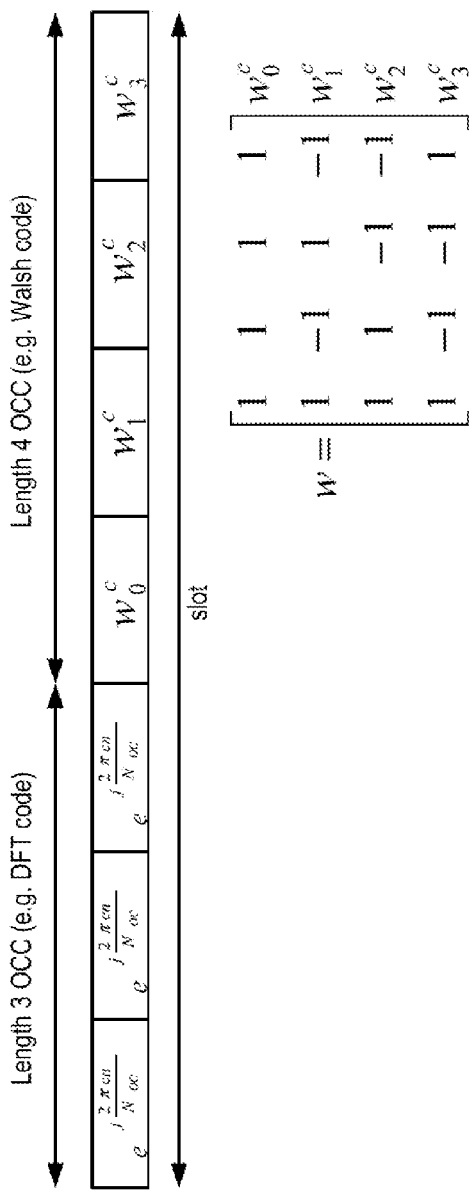
FIG. 3 illustrates an example PUCCH structure having a two part, slot length OCC.

In other embodiments, frequency hopping across slots may be disabled and an OCC of subframe length (e.g., 14 and 12 for normal CP and extended CP, respectively) may be applied to further increase the multiplexing capacity. FIG. 3 illustrates an example PUCCH structure with a subframe length OCC. In this embodiment, the OCC may be a DFT code, a Walsh code, a Hadamard sequence, or the like.

Figure 4:
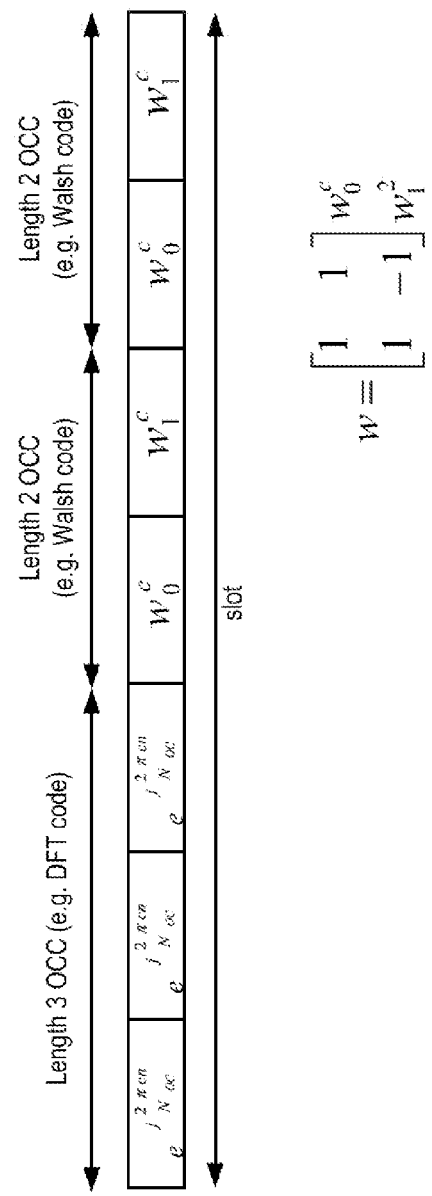
FIG. 4 illustrates an example PUCCH structure having a three part, slot length OCC.

In some embodiments, the slot or subframe may be divided into one or more units for spreading by an OCC. Each unit may include one or more SC-FDMA symbols and may be arranged in various arrangements. Each unit may further be assigned to different UE groups, for example, to further facilitate multiplexing in device discovery. For example, in a normal CP case, the symbols may be divided into two units having a length of 3 and 4 or three units having lengths of 3, 2, and 2, etc. FIGS. 3 and 4 illustrate example PUCCH structures having various unit lengths. In one embodiment, each unit may include contiguous SC-FDMA symbols to ensure orthogonality even in high speed chases. The overall multiplexing capacity of these embodiments may be the same as those described above with reference to FIG. 2 since the entire slot or subframe may be used for OCC multiplexing.

In some embodiments, the CS, the OCC, or both may be turned off or may be set to a fixed value. For example, if the channel is too frequency selective to accommodate a cyclic shift, the cyclic shift can be turned off or a fixed value (e.g., 0) for the cyclic shift may be used. If the UE is experiencing high mobility, the OCC may be turned off or a fixed value (e.g., [1, . . . , 1]) for the orthogonal code may be used.

Figure 5:
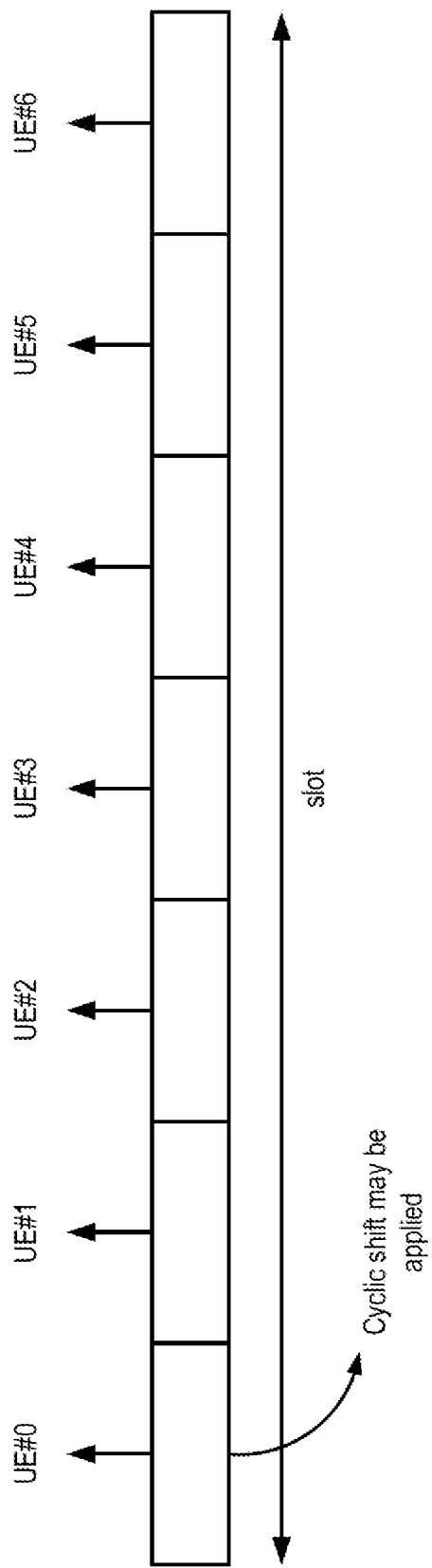
FIG. 5 illustrates an example PUCCH structure using TDM for additional UE multiplexing.

In one embodiment, by removing OCC, each SC-FDMA symbol may correspond to a particular UE (i.e., time division multiplexing (TDM) mode of operation). FIG. 5 illustrates an example PUCCH structure using TDM for additional UE multiplexing. The overall multiplexing capacity for a normal CP case is 4200 (i.e., $N_{max,total}=12 \cdot 7 \cdot 50$).

Figure 6:
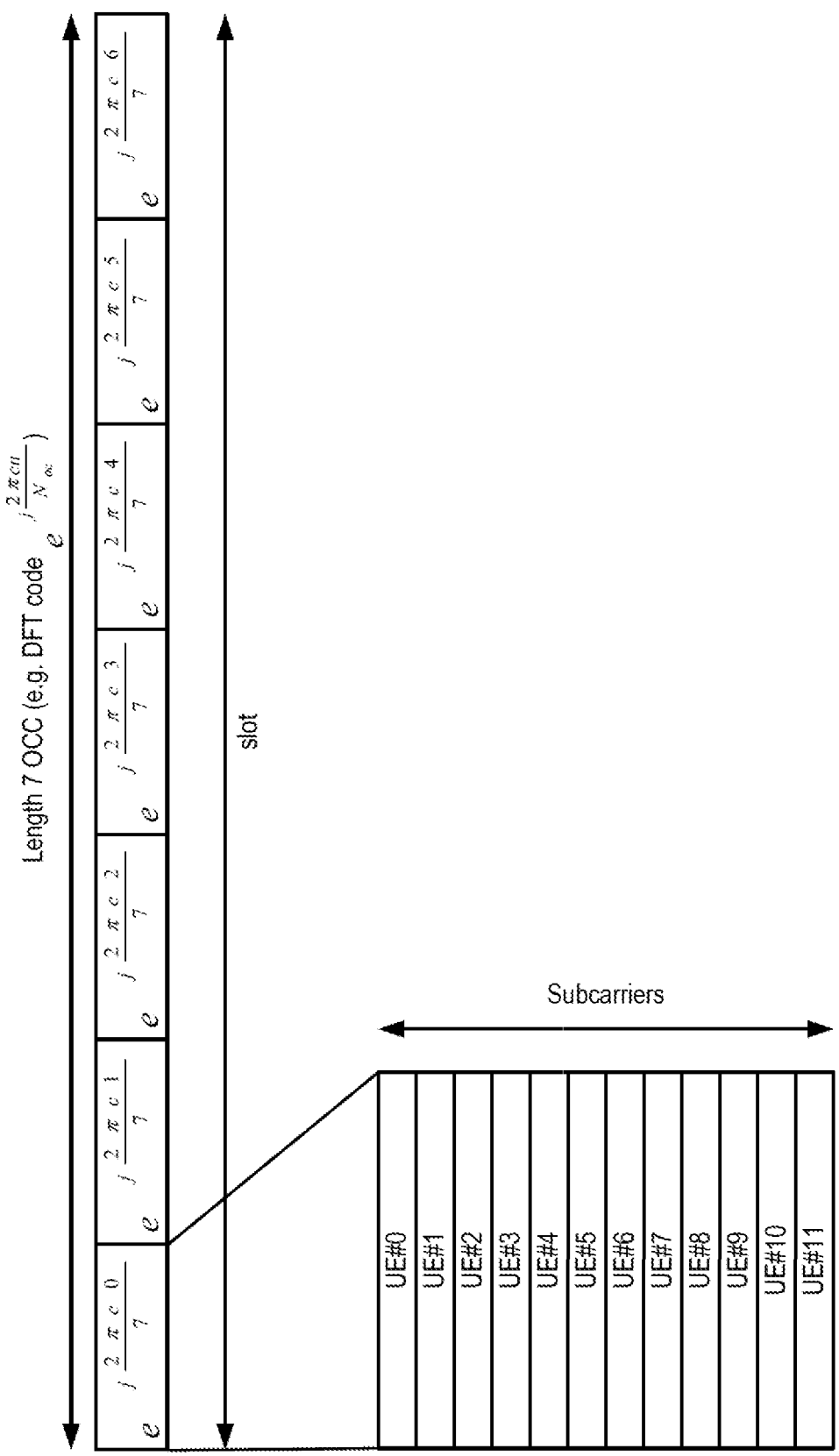
FIG. 6 illustrates an example PUCCH structure using FDM for additional UE multiplexing.

In another embodiment, the cyclic shift for each SC-FDMA symbol may be replaced by frequency division multiplexed (FDM) transmission. FIG. 6 illustrates an example PUCCH structure using FDM for additional UE multiplexing. In this embodiment each subcarrier of an SC-FDMA symbol may be associated with a UE. In the example PUCCH structure of FIG. 6, the number of subcarriers within a PRB is 12 and the multiplexing capacity is 4200, the same as the case with cyclic shift (i.e., $N_{max,total}=12 \cdot 7 \cdot 50$, where instead of a multiplexing capacity of 12 using cyclic shift, the multiplexing capacity of 12 comes from the subcarriers within the PRB). In some embodiments, FDM may not be applied and only CDM (e.g., time domain OCC) may be applied.

Figure 7:
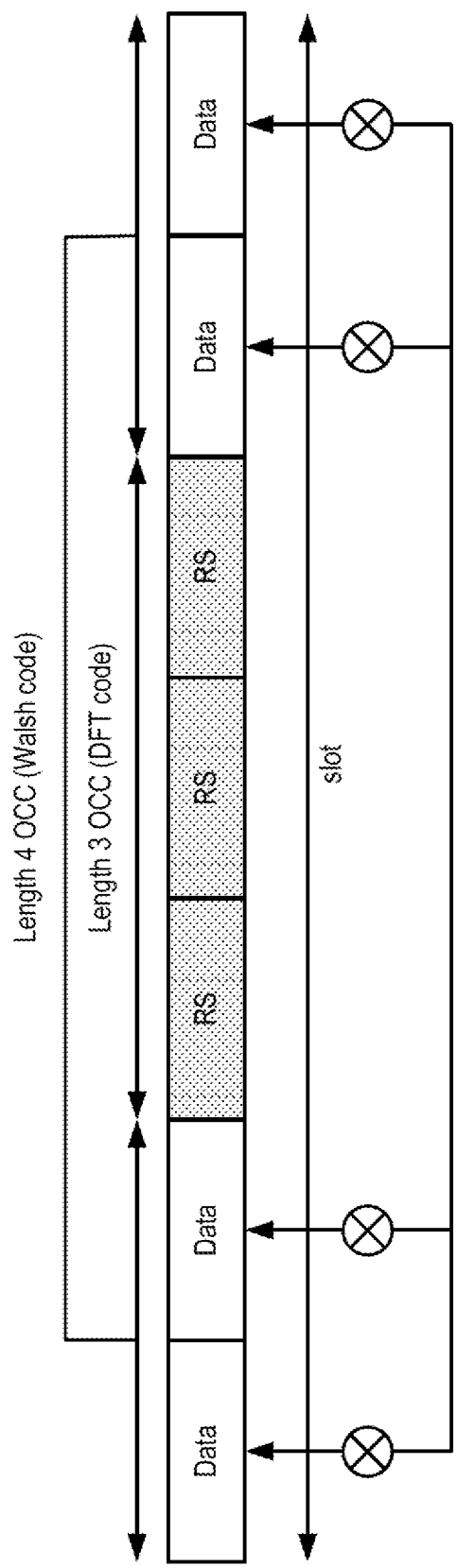
FIG. 7 illustrates an example PUCCH structure showing phase modulation of a data part.

In some embodiments, the overall multiplexing capacity of a communication system may be increased without having to modify an existing physical channel format. For example, the data part of a PUCCH slot can be modulated by various schemes to increase the data carrying capacity. FIG. 7 illustrates an example PUCCH structure showing phase modulation of a data part. In some embodiments, the modulation order and scheme can be QPSK to provide the robust performances. This modulated information can provide either additional information or increase of the multiplexing capacity. The multiplexing capacity can be increased by a factor of the number of additional bits of information provided by the higher order modulation. For example, assuming 20 MHz system bandwidth (i.e., 100 PRBs), with BPSK, QPSK, 8PSK, 16QAM modulation on the data part, the overall multiplexing capacity becomes 3600 (2 times multiplexing capacity), 7200 (4 times multiplexing capacity), 14400 (8 times multiplexing capacity), and 28800 (16 times multiplexing capacity), respectively.

If the modulation symbol value is used to convey additional information instead of increase multiplexing capacity, with BPSK. QPSK, 8PSK, and 16QAM modulation, 1, 2, 3, and 4 bits of information can be conveyed, respectively, while the multiplexing capacity remains 1800 for all modulation schemes. In one embodiment, a common format for a discovery signal may be used for D2D and network deployments, with the information conveyed by the modulation symbol representing one or the other. In another embodiment, where the discovery signal is for use in a D2D deployment, the modulation symbol may represent a particular request or device status (e.g., a scheduling request, emergency status, normal operation status, or the like).

In some embodiments, due to the close proximity of communication in D2D and small cell networks, the maximum delay spread of a physical channel may be relatively small compared to a macro-cell scenario. Because of the smaller delay spread, a greater number of cyclic shifts can be employed within a symbol. For example, if the number of cyclic shifts is increased to 24 (from 12), the overall multiplexing capacity for the communication system may be doubled.

In one embodiment, the cyclic shift may be determined according to the equation:

$$\alpha_{\tilde{p}}(n_s, l) = 2\pi \cdot n_{CS}^{(\tilde{p})}(n_s, l)/M$$

where:

M is the number of cyclic shifts; and $$n_{cs}^{(\tilde{p})}(n_s, l) = \begin{cases} [n_{cs}^{cell}(n_s, l) + (n'_{\tilde{p}}(n_s) \cdot \Delta_{shift}^{PUCCH} + (n_{oc}^{(\tilde{p})}(n_s) \mathrm{mod} \Delta_{shift}^{PUCCH})) \mathrm{mod} N'] \mathrm{mod} M \\ [n_{cs}^{cell}(n_s, l) + (n'_{\tilde{p}}(n_s) \cdot \Delta_{shift}^{PUCCH} + n_{oc}^{(\tilde{p})}/2) \mathrm{mod} N'] \mathrm{mod} M \end{cases}$$

for normal CP and extended CP, respectively.

In another embodiment, the overall multiplexing capacity of the communication system may be increased by removing the functionality of frequency hopping and applying independent orthogonal resources in each slot. For example, assuming, a 20 MHz system bandwidth (i.e., 100 PRBs) the multiplexing capacity of the system can be doubled when using all of the orthogonal resources (i.e., $N_{max,total} = 12 \cdot 7 \cdot 100$).

In some D2D or small cell implementations, an orthogonal resource in a discovery signal may be used to convey useful identification information. For example, the orthogonal resource may carry a UE-ID (e.g., a radio network temporary identifier (RNTI)), a cell ID, a D2D-ID, other device related IDs, etc. In a small cell discovery scenario, for example, a physical cell ID (PCID), a global cell ID (GCID), a cluster ID, or the like may be conveyed using orthogonal resources of the discovery signal. In one embodiment, the value of the orthogonal resource may be based on the PCID or GCID.

In a D2D discovery scenario, for example, an orthogonal resource may be used to convey a device related ID, such as a UE-ID. For example, in some embodiments, the network may assign a particular orthogonal resource to a UE and maintain a database that relates the orthogonal resource to the particular UE. In other embodiments, orthogonal resources may be related to a UE-ID (e.g., RNTI) in a predefined relationship. For example:

$$\mathrm{RNTI} = N_{SR} \cdot I_{SR} + n_{PUCCH}^{(1)} \text{ or } \mathrm{RNTI} = N_{I_{SR}} \cdot n_{PUCCH}^{(1)} + I_{SR}$$

where:

$N_{SR}$ is the number of PUCCH resources within a subframe;
$I_{SR}$ is a scheduling request (SR) configuration index;
$n_{PUCCH}^{(1)}$ is an orthogonal resource index; and
$N_{I_{SR}}$ is the total number of SR configurations.

In various embodiments, a cluster of UEs may be defined for D2D and small cell implementations. For example, a first cluster may comprise one or more UEs that are in a proximate region and a second cluster may comprise one or more UEs that are not proximate. In one embodiment, UE location information may be used to determine device proximity for clustering. As described above, a discovery signal structure may comprise a base sequence and an orthogonal sequence. Each orthogonal sequence may include, for example, CS, OCC, or the like. The orthogonal sequences may be sensitive to time and/or frequency synchronization differences at the receiver. On the other hand, the base sequence is quasi-orthogonal and is less sensitive to time/frequency synchronization differences. Given that, the various orthogonal sequences having the same base sequence can be used to differentiate IDs within a cluster and various base sequences can be used to differentiate different clusters to improve device discovery performance.

Figure 8:
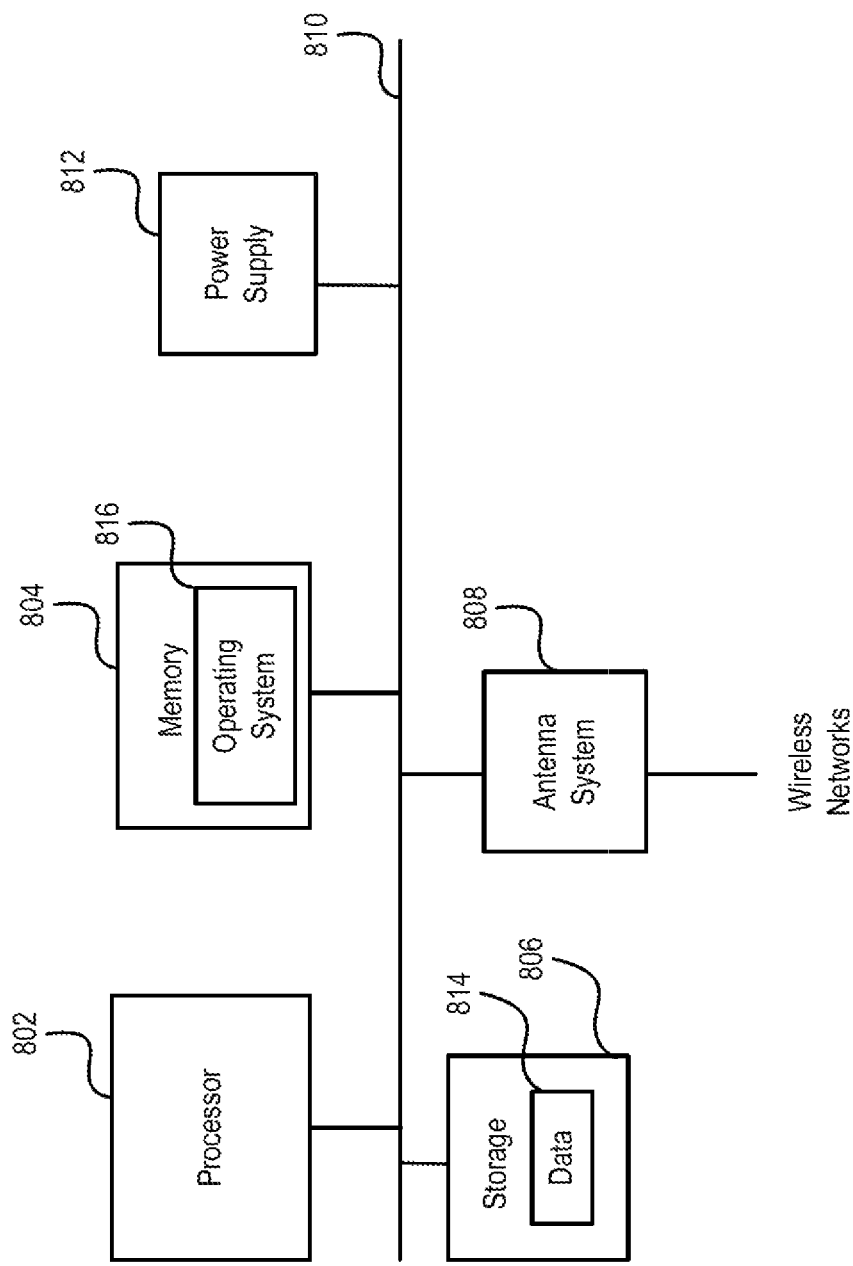
FIG. 8 is a high-level block diagram showing an example of the architecture of a user equipment (UE).

FIG. 8 is a high-level block diagram showing an example of the architecture of a UE. In the illustrated embodiment, the UE architecture comprises a processing system that includes a processor subsystem 802 that can include one or more processors. The UE architecture further includes a memory 804, a storage module 806, and an antenna system 808, each interconnected by an interconnect 810 and powered by a power supply 812.

The UE architecture can be embodied as a single- or multi-processor system that preferably implements a high-level module to send and receive data to and from an eNB or another UE. The data may be communicated via the antenna system 808, which can include a single antenna or multiple antenna system capable of receiving and transmitting data on one or more frequencies. The data 814 can be stored in the storage module 806 so that it can be retrieved by the processor subsystem 802 and memory 804.

The memory 804 illustratively comprises storage locations that can be addressed by the processor subsystem 802 and the UE architecture's other components for storing software program code and data structures. The processor subsystem 802 and the associated components may, in turn, include processing elements and/or logic circuitry configured to execute the software code and manipulate the data structures. The operating system 816, portions of which are typically resident in memory 804 and executed by the processor subsystem 802, functionally organizes the UE architecture. It will be apparent to those skilled in the art that other processing and memory implementations, including various computer readable storage media, may be used for storing and executing program instructions pertaining to the techniques introduced herein.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

The Following are Example Embodiments:

In one embodiment, a UE for use in device-to-device or network communication includes a processing unit and a memory coupled with the processing unit, the memory storing instructions. When executed by the processor, the instructions cause the processor to generate a plurality of multiple access symbols for transmission on a physical channel. To generate the plurality of multiple access symbols, the instructions cause the processor to multiply a modulation symbol with a first sequence to generate a second sequence, apply a series of cyclic shifts to the second sequence to generate a plurality of shifted sequences, apply at least one orthogonal code cover (OCC) of total length N to the plurality of shifted sequences, and map the orthogonal shifted sequences onto subcarriers of a plurality of physical resource blocks (PRBs) of the physical channel. To facilitate a multiplexing function of the device-to-device or network communication, the processing unit increases at least one of: the number of cyclic shifts, the total length of the at least one OCC, or the number of PRBs available. The instructions further cause the processor to transmit the plurality of multiple access symbols on the physical channel.

In one example embodiment, the number of cyclic shifts is greater than 12. In one example embodiment, the total length N of the at least one OCC is 7. In another example embodiment, the total length N of the at least one OCC is 6. In various embodiments, the OCC comprises one or more of a DFT code, a Walsh code, or a Hadarmard code.

In one embodiment, to increase the number of PRBs available, the instructions cause the processor to disable frequency hopping across time slots in the physical channel. If frequency hopping is disabled, in one embodiment, the total length N of the at least one OCC is 14. In another example embodiment, the total length N of the at least one OCC is 12.

In various embodiment, a fixed value may be used for one or more of the cyclic shift or the OCC.

In one embodiment, to facilitate the multiplexing function of the device-to-device or network communication, the instructions further cause the processing unit to modulate a data part of the plurality of multiple access symbols with a phase modulation scheme.

In one embodiment, the network comprises a 3GPP Long Term Evolution (LTE) network and the physical channel comprises a physical uplink control channel (PUCCH).

In one embodiment, the multiple access symbols comprise single-carrier frequency division multiple access (SC-FDMA) symbols. In another embodiment, the multiple access symbols comprise orthogonal frequency division multiple access (OFDMA) symbols.

In another example embodiment, a 3GPP Long Term Evolution (LTE) user equipment (UE) includes a processing unit and a memory coupled with the processing unit, the memory storing instructions. When the processor cause the processor to generate a plurality of multiple access symbols. In one embodiment, to generate the plurality of multiple access symbols, the instructions cause the processing unit to multiply a modulation symbol with a cell specific base sequence to generate a new sequence, apply a series of cyclic shifts to the new sequence to generate a plurality of shifted sequences, and apply at least one orthogonal code cover (OCC) of total length N to the shifted sequences, where N is equal to the number of shifted sequences and each of the at least one OCCs is applied to contiguous shifted sequences. The instructions may further cause the processing unit to transmit the plurality of multiple access symbols on a physical uplink control channel (PUCCH) of an LTE network.

In various embodiments, the OCC comprises one or more of a DFT code, a Walsh code, or a Hadarmard code.

In one embodiment, the instructions further cause the processing unit to puncture at least one multiple access symbol to accommodate a sounding reference symbol (SRS).

In another embodiment, the instructions further cause the processing unit to apply frequency hopping to the plurality of multiple access symbols.

In one embodiment, the number of cyclic shifts is greater than 12.

In one embodiment, the multiple access symbols comprise single-carrier frequency division multiple access (SC-FDMA) symbols. In another embodiment, the multiple access symbols comprise orthogonal frequency division multiple access (OFDMA) symbols.

In a further example embodiment, a non-transitory computer readable storage medium stores instructions thereon, which when executed by a processor, cause the processor to perform a method for device discovery in a device-to-device or network communication. In the example embodiment, the method includes generating a plurality of multiple access symbols, wherein the plurality of multiple access symbols include a data part and a reference signal part, applying an orthogonal code cover (OCC) of length N to the data part of the plurality of multiple access symbols and an OCC of length M to the reference signal part of the plurality of multiple access symbols, wherein N is equal to the number of multiple access symbols in the data part and M is equal to the number of multiple access symbols in the reference symbol part, modulating the data part of the plurality of multiple access symbols with a phase modulation scheme, and transmitting the plurality of multiple access symbols.

In various embodiments, the phase modulation comprises one or more of binary phase-shift keying (BPSK) modulation, quadrature phase-shift keying (QPSK) modulation, 8-PSK modulation, quadrature amplitude modulation (QAM), or the like.

In some embodiments, a modulation symbol used for the phase modulation comprises an information bit. In one embodiment, the information bit may be used for differentiating between a discovery signal for device-to-device and network communication. In another embodiment, the information bit may represent a scheduling request in device-to-device communication. In yet another embodiment, the information bit represents an emergency status in device-to-device communication.

In one embodiment, the multiple access symbols comprise single-carrier frequency division multiple access (SC- FDMA) symbols. In another embodiment, the multiple access symbols comprise orthogonal frequency division multiple access (OFDMA) symbols.

In a further example embodiment, a method for device discovery in a device-to-device or network communication includes generating, by a user equipment (UE), a plurality of multiple access symbols for transmission on a physical channel, embedding identification information for use in device discovery in the plurality of multiple access symbols, and transmitting the plurality of multiple access symbols on the physical channel.

In various embodiments, the identification information comprises one of: a UE identifier, a physical cell identifier, a global cell identifier, or a device-to-device identifier.

In one embodiment, generating a plurality of multiple access symbols includes multiplying a modulation symbol with a base sequence to generate a new sequence, wherein the modulation symbol comprises the identification information, applying one or more orthogonal sequences to the new sequence to generate a plurality of new orthogonal sequences, and mapping the plurality of new orthogonal sequences onto subcarriers of a plurality of physical resource blocks (PRBs).

In another embodiment, generating a plurality of multiple access symbols includes multiplying a modulation symbol with a base sequence to generate a new sequence, applying one or more orthogonal sequences to the new sequence to generate a plurality of new orthogonal sequences, wherein the one or more orthogonal sequences comprise the identification information, and mapping the plurality of new orthogonal sequences onto subcarriers of a plurality of physical resource blocks (PRBs).

In a further embodiment, the identification information includes a cluster identifier and a UE identifier. In one embodiment, generating a plurality of multiple access symbols includes multiplying a modulation symbol with a base sequence to generate a new sequence, wherein the modulation symbol comprises the cluster identifier, applying one or more orthogonal sequences to the new sequence to generate a plurality of new orthogonal sequences, wherein the one or more orthogonal sequences comprise the UE identifier, and mapping the plurality of new orthogonal sequences onto subcarriers of a plurality of physical resource blocks (PRBs).

In one embodiment, the network comprises a 3GPP Long Term Evolution (LTE) network.

In one embodiment, the multiple access symbols comprise single-carrier frequency division multiple access (SC-FDMA) symbols. In another embodiment, the multiple access symbols comprise orthogonal frequency division multiple access (OFDMA) symbols.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A user equipment (UE) for use in device-to-device or network communication, comprising:
   a processing unit; and
   a memory coupled with the processing unit, the memory storing instructions, which when executed by the processor cause the processor to:
      generate a plurality of multiple access symbols for transmission on a physical channel, wherein, to generate the plurality of multiple access symbols, the instructions cause the processor to:
         multiply a modulation symbol with a first sequence to generate a second sequence;
         apply a series of cyclic shifts to the second sequence to generate a plurality of shifted sequences;
         apply at least one orthogonal code cover (OCC) of total length N to the plurality of shifted sequences;
         map the orthogonal shifted sequences onto subcarriers of a plurality of physical resource blocks (PRBs) of the physical channel; and
      wherein to facilitate a multiplexing function of the device-to-device or network communication, the processing unit increases at least one of:
         the number of cyclic shifts, the total length of the at least one OCC, or the number of PRBs available; and
      transmit the plurality of multiple access symbols on the physical channel.

2. The UE of claim 1, wherein the number of cyclic shifts is greater than 12.

3. The UE of claim 1, wherein the total length N of the at least one OCC is 7.

4. The UE of claim 1, wherein, to increase the number of PRBs, the instructions cause the processor to disable frequency hopping across time slots in the physical channel.

5. The UE of claim 1, wherein to facilitate the multiplexing function of the device-to-device or network communication, the instructions further cause the processing unit to:
   modulate a data part of the plurality of multiple access symbols with a phase modulation scheme.

6. The UE of claim 1, wherein the network comprises a 3GPP Long Term Evolution (LTE) network.

7. The UE of claim 6, wherein the physical channel comprises a physical uplink control channel (PUCCH).

8. The UE of claim 1, wherein the multiple access symbols comprise single-carrier frequency division multiple access (SC-FDMA) symbols.

9. The UE of claim 1, wherein the multiple access symbols comprise orthogonal frequency division multiple access (OFDMA) symbols.

10. A 3GPP Long Term Evolution (LTE) user equipment (UE), comprising:
   a processing unit; and
   a memory coupled with the processing unit, the memory storing instructions, which when executed by the processing unit cause the processing unit to:
      generate a plurality of multiple access symbols, wherein, to generate the plurality of multiple access symbols, the instructions cause the processing unit to:
         multiply a modulation symbol with a cell specific base sequence to generate a new sequence;
         apply a series of cyclic shifts to the new sequence to generate a plurality of shifted sequences; and
         apply at least one orthogonal code cover (OCC) of total length N to the shifted sequences, wherein N is equal to the number of shifted sequences and each of the at least one OCCs is applied to contiguous shifted sequences; and
      transmit the plurality of multiple access symbols on a physical uplink control channel (PUCCH) of an LTE network.

11. The UE of claim 10, wherein the instructions further cause the processing unit to puncture at least one multiple access symbol to accommodate a sounding reference symbol (SRS).

12. The UE of claim 10, wherein the instructions further cause the processing unit to apply frequency hopping to the plurality of multiple access symbols.

13. The UE of claim 10, wherein the number of cyclic shifts is greater than 12.

14. The UE of claim 10, wherein the multiple access symbols comprise single-carrier frequency division multiple access (SC-FDMA) symbols.

15. The UE of claim 10, wherein the multiple access symbols comprise orthogonal frequency division multiple access (OFDMA) symbols.

16. A non-transitory computer readable storage medium having thereon instructions, which when executed by a processor, cause the processor to perform a method for device discovery in a device-to-device or network communication, the method comprising:
   generating a plurality of multiple access symbols, wherein the plurality of multiple access symbols include a data part and a reference signal part;
   applying an orthogonal code cover (OCC) of length N to the data part of the plurality of multiple access symbols and an OCC of length M to the reference signal part of the plurality of multiple access symbols, wherein N is equal to the number of multiple access symbols in the data part and M is equal to the number of multiple access symbols in the reference symbol part;
   modulating the data part of the plurality of multiple access symbols with a phase modulation scheme; and
   transmitting the plurality of multiple access symbols.

17. The non-transitory computer readable storage medium of claim 16, wherein a modulation symbol used for the phase modulation comprises an information bit.

18. The non-transitory computer readable storage medium of claim 17, wherein the information bit is used for differentiating between a discovery signal for device-to-device and network communication.

19. The non-transitory computer readable storage medium of claim 17, wherein the information bit represents a scheduling request in device-to-device communication.

20. The non-transitory computer readable storage medium of claim 17, wherein the information bit represents an emergency status in device-to-device communication.

21. A method for device discovery in a device-to-device or network communication, the method comprising:
   generating, by a user equipment (UE), a plurality of multiple access symbols for transmission on a physical channel;
   embedding identification information for use in device discovery in the plurality of multiple access symbols; and
   transmitting the plurality of multiple access symbols on the physical channel;
   wherein generating a plurality of multiple access symbols comprises:
      multiplying a modulation symbol with a base sequence to generate a new sequence, wherein the modulation symbol comprises the identification information;
      applying one or more orthogonal sequences to the new sequence to generate a plurality of new orthogonal sequences; and
      mapping the plurality of new orthogonal sequences onto subcarriers of a plurality of physical resource blocks (PRBs).

22. The method of claim 21, wherein the identification information comprises one of: a UE identifier, a physical cell identifier, a global cell identifier, or a device-to-device identifier.

23. The method of claim 21, wherein the identification information includes a cluster identifier and a UE identifier.

24. The method of claim 21, wherein the network comprises a 3GPP Long Term Evolution (LTE) network.

* * * * *